(12) United States Patent
Serebrin

(10) Patent No.: US 8,352,670 B2
(45) Date of Patent: Jan. 8, 2013

(54) EXECUTE-ONLY MEMORY AND MECHANISM ENABLING EXECUTION FROM EXECUTE-ONLY MEMORY FOR MINIVISOR

(75) Inventor: Benjamin C. Serebrin, Sunnyvale, CA (US)

(73) Assignee: GLOBALFOUNDRIES Inc., Grand Cayman (KY)

( * ) Notice: Subject to any disclaimer, the term of this patent is extended or adjusted under 35 U.S.C. 154(b) by 1086 days.

(21) Appl. No.: 12/272,951

(22) Filed: Nov. 18, 2008

(65) Prior Publication Data

US 2009/0187697 A1 Jul. 23, 2009

Related U.S. Application Data

(60) Provisional application No. 61/022,700, filed on Jan. 22, 2008.

(51) Int. Cl.
*G06F 12/14* (2006.01)
(52) U.S. Cl. ............................................. 711/6; 711/163
(58) Field of Classification Search ................ 711/6, 163
See application file for complete search history.

(56) References Cited

U.S. PATENT DOCUMENTS

| | | | | |
|---|---|---|---|---|
| 5,978,882 A | * | 11/1999 | Adams | 711/2 |
| 6,029,205 A | * | 2/2000 | Alferness et al. | 719/310 |
| 2004/0117593 A1 | * | 6/2004 | Uhlig et al. | 711/207 |
| 2006/0158690 A1 | * | 7/2006 | Willman | 358/1.16 |
| 2008/0022065 A1 | * | 1/2008 | Gutti et al. | 711/170 |

OTHER PUBLICATIONS

Intel, "Intel 64 and IA-32 Architectures Software Developers Manual," vol. B: System Programming Guide, Part 2, Sep. 2008, 18 pages.
David Iie, et al., "Architectural Support for Copy and Tamper Resistant Software," ACM 2000, 10 pages.
Blaise Gassend, et al., "Caches and Hash Trees for Efficient Memory Integrity Verification," IEEE 2002, Proceedings of the Ninth International Symposium on high-Performance Computer Architecture, 12 pages.

* cited by examiner

*Primary Examiner* — Jared Rutz
(74) *Attorney, Agent, or Firm* — Lawrence J. Merkel; Meyertons, Hood, Kivlin, Kowert & Goetzel, P.C.

(57) ABSTRACT

In one embodiment, a processor comprises an execution core configured to execute instructions; and a register configured to store an execute-only valid indication indicative of whether or not execution of instructions is permitted in pages that are indicated as execute-only in a set of page tables used by the processor for address translation. The execution core is configured, responsive to a fetch within an execute-only page, to signal a fault responsive to the execute-only valid indication indicating that execution is not permitted in the execute-only page, and wherein the execution core is configured to permit the fetch within the execute-only page responsive to the execute-only valid indication indicating that execution is permitted in the execute-only page.

11 Claims, 11 Drawing Sheets

| 6 3 | | | | | 5 2 | 5 1 | | | | | | | | | | | | 3 2 |
|---|---|---|---|---|---|---|---|---|---|---|---|---|---|---|---|---|---|---|---|
| | Available | | | | | | Address | | | | | | | | | | | | |

| 3 2 | | | | | | | | | 1 2 | 1 1 | 9 | 8 | 7 | 6 | 5 | 4 | 3 | 2 | 1 | 0 |
|---|---|---|---|---|---|---|---|---|---|---|---|---|---|---|---|---|---|---|---|---|
| Address | | | | | | | | | AVL | | | | | | EPT Type | | | X | W | R |

74

| X | W | R | Meaning |
|---|---|---|---|
| 0 | 0 | 0 | Not Present, Page Fault |
| 0 | 0 | 1 | Present, Read only |
| 0 | 1 | 0 | Present, Write Only |
| 0 | 1 | 1 | Present, Read/Write |
| 1 | 1 | 1 | Present, Read/Write/Exe |
| 1 | 1 | 0 | Present, Write/Exe |
| 1 | 0 | 0 | Present, Execute Only |
| 1 | 0 | 1 | Present, Read/Exe |

| 6 | 6 | 6 | | 5 | 5 | | 3 |
|---|---|---|---|---|---|---|---|
| 3 | 2 | 1 | | 2 | 1 | | 2 |

| NX | R | Available | Address |
|---|---|---|---|

| 3 | | | 1 | 1 | | | | | | | | | | |
|---|---|---|---|---|---|---|---|---|---|---|---|---|---|---|
| 2 | | | 2 | 1 | 9 | 8 | 7 | 6 | 5 | 4 | 3 | 2 | 1 | 0 |

| Address | AVL | G | PAT | D | A | PCD | PWT | U/S | W | P |
|---|---|---|---|---|---|---|---|---|---|---|

70 ⤴

| P | W | R | NX | Meaning |
|---|---|---|---|---|
| 0 | x | x | x | Not Present, Page Fault |
| 1 | 0 | 0 | 1 | Present, Page Fault |
| 1 | 1 | 0 | 1 | Present, Write Only |
| 1 | 1 | 1 | 1 | Present, Read/Write |
| 1 | 0 | 1 | 1 | Present, Read only |
| 1 | 1 | 1 | 0 | Present, Read/Write/Exe |
| 1 | 1 | 0 | 0 | Present, Write/Exe |
| 1 | 0 | 0 | 0 | Present, Execute Only |
| 1 | 0 | 1 | 0 | Present, Read/Exe |

Partial Host State Saved by VMRUN Instruction/Loaded at Guest Exit

CS.Selector
    next_RIP
    RFLAGS
    RAX
    SS.Selector
    RSP
    CR0
    CR3
    CR4
    EFER
    IDTR
    GDTR
    DS.Selector
    ES.Selector

102 —  — 100

Partial Guest State Loaded by VMRUN Instruction/Saved at Guest Exit

CS.Selector and CS.Hidden
    RIP
    RFLAGS
    RAX
    SS.Selector and SS.Hidden
    RSP
    CR0
    CR2
    CR3
    CR4
    EFER
    IDTR
    GDTR
    DS.Selector and DS.Hidden
    ES.Selector and ES.Hidden
    DR6 and DR7
    VM Regs

Fig. 12

| Minivisor Intercept | | |
|---|---|---|
| Saved to VMCB | Loaded from VMCB | Other Mods |
| gRIP | mRIP | GIF=0 |
| gRSP | mRSP | CPL=0 |
| guest mode | mIDT | long mode |
| gIDT | | RAX=VMCB |
| gRAX | | clear intercepts |
| gCPL | | set mode bits |
| gCS.Selector and gCS.Hidden | | segments |
| | | set XO-valid, if applicable |

— 104

106 —

| Minivisor Return | | |
|---|---|---|
| Saved to VMCB | Loaded from VMCB | Other Mods |
| mRSP | gRIP | GIF=1 |
| | gRSP | clear mode bits |
| | guest mode | clear XO-Valid |
| | gIDT | |
| | gRAX | |
| | gCPL | |
| | gCS.Selector and gCS.Hidden | |
| | restore intercepts | |

Fig. 13

EXECUTE-ONLY MEMORY AND MECHANISM ENABLING EXECUTION FROM EXECUTE-ONLY MEMORY FOR MINIVISOR

This application claims benefit of priority to U.S. Provisional Patent Application Ser. No. 61/022,700, filed Jan. 22, 2008. The Provisional Patent Application is incorporated herein by reference. To the extent that anything in the Provisional Patent Application contradicts material expressly included herein, the material herein controls.

BACKGROUND

1. Field of the Invention

This invention relates to virtual machines in computer systems and, more particularly, to using execute-only memory to speed virtual machine monitor operation.

2. Description of the Related Art

Virtualization has been used in computer systems for a variety of different purposes. For example, virtualization can be used to execute privileged software in a "container" to prevent the privileged software from directly accessing and/or making changes to at least some of the physical machine state without first being permitted to do so by a virtual machine manager (VMM) that controls the virtual machine. Such a container can prevent "buggy" or malicious software from causing problems on the physical machine. Additionally, virtualization can be used to permit two or more privileged programs to execute on the same physical machine concurrently. The privileged programs can be prevented from interfering with each other since access to the physical machine is controlled. Privileged programs may include operating systems, and may also include other software which expects to have full control of the hardware on which the software is executing. In another example, virtualization can be used to execute a privileged program on hardware that differs from the hardware expected by the privileged program.

Generally, virtualization of a processor or computer system may include providing one or more privileged programs with access to a virtual machine (the container mentioned above) over which the privileged program has full control, but the control of the physical machine is retained by the VMM. The virtual machine may include a processor (or processors), memory, and various peripheral devices that the privileged program expects to find in the machine on which it is executing. The virtual machine elements may be implemented by hardware that the VMM allocates to the virtual machine, at least temporarily, and/or may be emulated in software. Each privileged program (and related software in some cases, such as the applications that execute on an operating system) may be referred to herein as a guest. Virtualization may be implemented in software (e.g. the VMM mentioned above) without any specific hardware virtualization support in the physical machine on which the VMM and its virtual machines execute. However, virtualization may be simplified and/or achieve higher performance if some hardware support is provided.

In order to maintain control over the physical machine, the VMM may intercept various events that occur during guest execution. For example, the events may include certain instructions that access privileged state, as well as certain exception/interrupt events. In cases in which a guest is virtual machine "aware," the privileged code in the virtual machine may make a call to the VMM. In response to an intercept or call, switching between execution of the VMM and the execution of guests occurs. Additionally, when the VMM schedules a guest for execution, a switch to executing that guest is performed. At various points in time, a switch from executing a guest to executing the VMM also occurs so that the VMM can retain control over the physical machine (e.g. when the guest attempts to access a peripheral device, when a new page of memory is to be allocated to the guest, when it is time for the VMM to schedule another guest, etc.). A switch between a guest and the VMM (in either direction) is often referred to as a "world switch".

Generally, the world switch involves saving processor state for the guest/VMM being switched away from, and restoring processor state for the guest/VMM being switched to. In some cases, saving/restoring all of the state is necessary. For example, when a guest is being started for the first time, none of the corresponding processor state has been loaded and thus all of the processor state may be saved/loaded. However, in other cases, some of the processor state may not change from guest context to VMM context and vice-versa. In still other cases, a world switch may be brief (e.g. the VMM may execute briefly to service a simple guest exit for an intercepted event), and only a small amount of processor state for the VMM may be needed.

SUMMARY

In one embodiment, a processor comprises an execution core configured to execute instructions; and a register configured to store an execute-only valid indication indicative of whether or not execution of instructions is permitted in pages that are indicated as execute-only in a set of page tables used by the processor for address translation. The execution core is configured, responsive to a fetch within an execute-only page, to signal a fault responsive to the execute-only valid indication indicating that execution is not permitted in the execute-only page, and wherein the execution core is configured to permit the fetch within the execute-only page responsive to the execute-only valid indication indicating that execution is permitted in the execute-only page.

In an embodiment, a computer accessible storage medium stores a plurality of instructions which, when executed: establish one or more execute-only pages in a set of page tables for a processor, wherein the execute-only pages are mapped from one or more guest pages in a guest address space of a virtual machine guest that is controlled by a virtual machine monitor; and load code to be executed in response to a predefined guest event into the execute-only pages, whereby the code is executable from the guest address space but the virtual machine guest is prevented from viewing the code.

In an embodiment, a method comprises a processor detecting an event during execution of a virtual machine guest that is controlled by a virtual machine monitor, wherein the event is defined to enable execution from one or more execute-only pages; and the processor enabling execution from the execute-only pages.

BRIEF DESCRIPTION OF THE DRAWINGS

The following detailed description makes reference to the accompanying drawings, which are now briefly described.

FIG. 3A is a block diagram of one embodiment of a page table entry.

FIG. 3B is a block diagram of another embodiment of a page table entry.

FIG. 12 is a pair of tables illustrating one embodiment of processor state saved and loaded during switches between host and guest execution.

FIG. 13 is a pair of tables illustrating one embodiment of processor state saved and loaded during switches between minivisor and guest execution.

Figure 1:
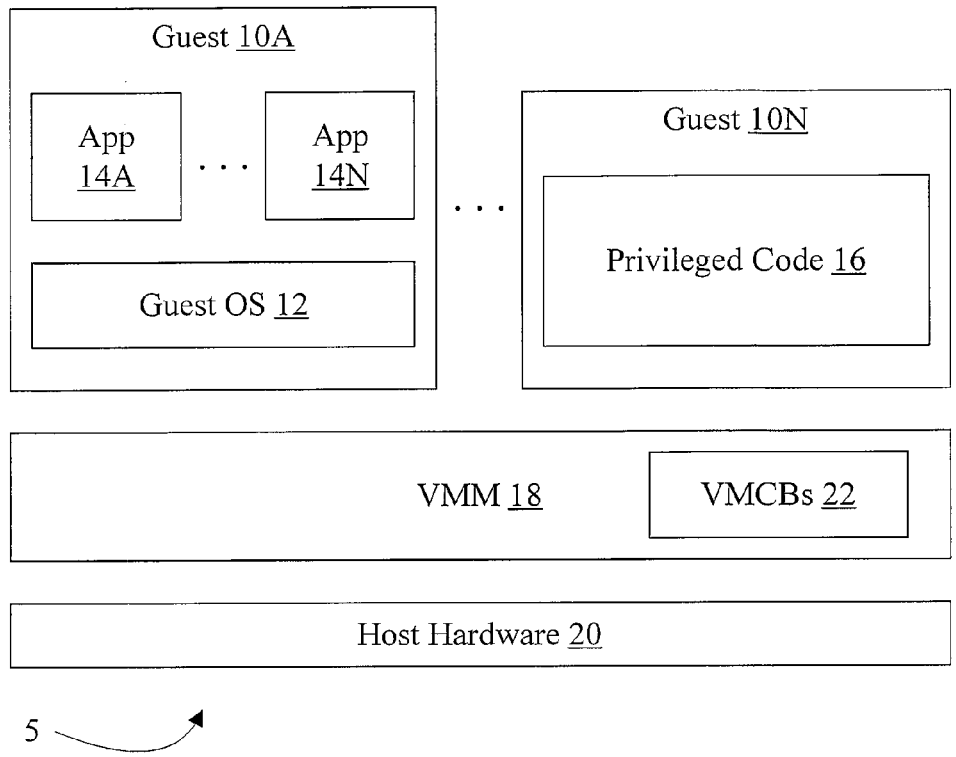
FIG. 1 is a block diagram of one embodiment of a computer system that implements virtualization.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Execute-Only Memory to Protect Trusted Code in the Guest

To streamline world switching and potentially improve performance, a portion of the VMM may be located in the guest's address space. This portion will be referred to herein as a "minivisor." Generally, the minivisor may handle simpler tasks that may require a smaller processor state save in the world switch. Additionally, because the minivisor executes in the guest's address space, the minivisor may have simpler and more rapid access to the guest's data stored in memory and/or the guest's processor state. Accordingly, minivisor processing of certain intercepts from the guest may be faster than would be possible with a full exit to the VMM, improving overall virtual machine performance. The minivisor may also include code to process calls by a virtual machine aware guest. That is, the guest may intentionally request a service from the VMM. Such calls may be performed more rapidly to the minivisor than would be possible in a full switch to the VMM, in some embodiments. Furthermore, other code that is trusted by the VMM may be injected into the guest (i.e. the code need not be minivisor code). The minivisor will be used as an example at various points in the text below, but generally any trusted code may be used.

Because the minivisor is stored in the guest's address space, a mechanism to protect the minivisor code from interference and/or observation by the guest is needed. Generally, the guest is not "trusted" by the VMM, and thus it is desirable to protect the VMM from the guest. In one embodiment, a processor on which the VMM and virtual machines are executed may support page tables that include the ability to encode execute-only pages. An execute-only page is a page from which code can be executed by the processor, but which is neither readable (via load operations executed by the processor) nor writeable (via store operations executed by the processor). Thus, the execute-only pages may be protected from observation and modification by the guest. Additionally, in some embodiments, peripheral device or input/output (I/O) device access to the execute-only pages may be prevented. For example, some host hardware may include one or more I/O memory management units (IOMMUs) that may control device access to memory, and the IOMMUs may be used to prevent device access to execute-only pages. Code stored in an execute-only page may be referred to herein as execute-only code.

Additionally, the processor may support a mechanism or mechanisms for transition into the execute-only code. The mechanism may be designed to prevent accidental or malicious execution of the execute-only code. That is, if the processor generates a fetch for code in an execute-only page and the mechanism to transition to execute-only code has not been used, the processor may prevent the fetch. For example, the fetch may result in a page fault even though a translation is available in the page tables, because the translation is an execute-only page. In one embodiment, if the mechanism to transition to execute-only code is used, the processor may set an internal indication (e.g. an execute-only valid indication, or XO-valid indication) to a state that indicate the execution from an execute-only page is permissible. The processor may set the XO-valid indication to a state indicating that execution from an execute-only page is not permissible responsive to detecting a return to the guest (or an exit from executing the execute-only code). In one embodiment, the XO-valid indication may be a bit indicative, when set, that execute-only execution is permissible and indicative, when clear, that execute-only execution is not permissible. This embodiment will be used as an example below. Other embodiments may use the opposite encoding of the XO-valid bit or multi-bit indications.

The mechanism(s) to transition to execute-only code may include one or more of the following, in one embodiment: a specific call gate type that specifies a transition to execute-only code; an encoding of intercepts that are specified by the VMM as minivisor exits; and a specific instruction that is defined to enter execute-only code at an address (or entry point) defined in VMM-controlled state.

The specific call gate may be employed for embodiments that implement the x86 instruction set architecture or variations thereof such as the AMD64™ instruction set architecture. Generally, call gates can be used as a controlled mechanism for less-privileged code to call more-privileged code. The processor may recognize a new call gate type (the "XO gate") to transition to execute only code. The VMM may create one or more instances of the XO gate, one for each entry point in the minivisor. For example, the minivisor may include various routines that can be invoked by a virtual machine aware guest, and there may be an XO gate for each such routine. When the processor processes a call gate, the processor may set the XO-valid bit and may begin execution of the execute-only code.

The encoding of minivisor intercepts may be supported by the processor in addition to the encoding of full VMM intercepts. There may be various ways to encode minivisor and full VMM intercepts, described in more detail below. A minivisor exit may be performed in response to a minivisor intercept, and the minivisor exit may cause the processor to set the XO-valid bit.

The specific instruction may be a new instruction added to the instruction set architecture implemented by the processor. The specific instruction may be similar to the SYSCALL instruction, which uses an operating system-controlled address as the target to be executed in the operating system. Similarly, an XOCALL instruction may be defined, and a VMM controlled address may be used as the target. In response to executing the XOCALL instruction, the processor may set the XO-Valid bit.

Virtualization Overview

Turning now to FIG. 1, a block diagram of one embodiment of a computer system 5 that implements virtualization is shown. In the embodiment of FIG. 1, multiple guests 10A-10N are shown. Guest 10A includes a guest operating system (OS) 12 and one or more applications 14A-14N that run on the guest OS 12. Guest 10N includes privileged code 16. The guests 10A-10N are managed by a virtual machine manager (VMM) 18. The VMM 18 and the guests 10A-10N execute on host hardware 20, which may comprise the physical hardware included in the computer system 5. In one embodiment, the VMM 18 may maintain a set of virtual machine control blocks (VMCBs) 22. There may be one VMCB 22 for each guest 10A-10N. While the VMCBs 22 are shown as part of the VMM 18 for illustration in FIG. 1, the VMCBs 22 may be stored in memory and/or on non-volatile media such as disk drives in the host hardware 20.

The host hardware 20 generally includes all of the hardware included in the computer system 5. In various embodiments, the host hardware 20 may include one or more processors, memory, peripheral devices, and other circuitry used to couple the preceding components. For example, common personal computer (PC)-style systems may include a Northbridge coupling the processors, the memory, and a graphics device that uses the advanced graphic port (AGP) interface. Additionally, the Northbridge may couple to a peripheral bus such as the peripheral component interface (PCI) bus, to which various peripheral components may be directly or indirectly coupled. A Southbridge may also be included, coupled to the PCI bus, to provide legacy functionality and/or couple to legacy hardware. In other embodiments, other circuitry may be used to link various hardware components. For example, HyperTransport™ (HT) links may be used to link nodes, each of which may include one or more processors, a host bridge, and a memory controller. The host bridge may be used to couple, via HT links, to peripheral devices in a daisy chain fashion. Any desired circuitry/host hardware structure may be used.

In some embodiments, one or more components of the host hardware may include hardware support for virtualization. For example, the processor(s) may include hardware support for virtualization, as will be described in more detail below.

The VMM 18 may be configured to provide the virtualization for each of the guests 10A-10N, and may control the access of the guests 10A-10N to the host hardware 20. The VMM 18 may also be responsible for scheduling the guests 10A-10N for execution on the host hardware 20. The VMM 18 may be configured to use the hardware support provided in the host hardware 20 for virtualization.

In some embodiments, the VMM 18 may be implemented as a "thin" standalone software program that executes on the host hardware 20 and provides the virtualization for the guests 10A-10N. Such a VMM implementation may sometimes be referred to as a "hypervisor". In other embodiments, the VMM 18 may be integrated into or execute on a host OS. In such embodiments, the VMM 18 may rely on the host OS, including any drivers in the host OS, platform system management mode (SMM) code provided by the system BIOS, etc. Thus, the host OS components (and various lower-level components such as the platform SMM code) execute directly on the host hardware 20 and are not virtualized by the VMM 18. The VMM 18 and the host OS (if included) may together be referred to as the "host", in one embodiment.

In various embodiments, the VMM 18 may support full virtualization, para-virtualization, or both. Furthermore, in some embodiments, the VMM 18 may concurrently execute guests that are paravirtualized and guests that are fully virtualized.

With full virtualization, the guest 10A-10N is not aware that virtualization is occurring. Each guest 10A-10N may have contiguous, zero based memory in its virtual machine, and the VMM 18 may use shadow page tables or nested page tables to control access to the host physical address space. The shadow page tables may remap from guest virtual addresses to host physical addresses (effectively the remapping the guest "physical address" assigned by memory management software in the guest 10A-10N to host physical address), while nested page tables may receive the guest physical address as an input and map to the host physical address. Using the shadow page tables or nested page tables for each guest 10A-10N, the VMM 18 may ensure that guests do not access other guests' physical memory in the host hardware 20. In one embodiment, in full virtualization, guests 10A-10N do not directly interact with the peripheral devices in the host hardware 20.

With para-virtualization, guests 10A-10N may be at least partially VM-aware. Such guests 10A-10N may negotiate for memory pages with the VMM 18, and thus remapping guest physical addresses to host physical addresses may not be required. In one embodiment, in paravirtualization, guests 10A-10N may be permitted to directly interact with peripheral devices in the host hardware 20. At any given time, a peripheral device may be "owned" by a guest or guests 10A-10N. In one implementation, for example, a peripheral device may be mapped into a protection domain with one or more guests 10A-10N that currently own that peripheral device. Only guests that own a peripheral device may directly interact with it. There may also be a protection mechanism to prevent devices in a protection domain from reading/writing pages allocated to a guest in another protection domain.

As mentioned previously, the VMM 18 may maintain a VMCB 22 for each guest 10A-10N. The VMCB 22 may generally comprise a data structure stored in a storage area that is allocated by the VMM 18 for the corresponding guest 10A-10N. In one embodiment, the VMCB 22 may comprise a page of memory, although other embodiments may use larger or smaller memory areas and/or may use storage on other media such as non-volatile storage. In one embodiment, the VMCB 22 may include the guest's processor state, which may be loaded into a processor in the host hardware 20 when the guest is scheduled to execute and may be stored back to the VMCB 22 when the guest exits (either due to completing its scheduled time, or due to one or more intercepts that the processor detects for exiting the guest). In some embodiments, only a portion of the processor state is loaded via the instruction that transfers control to the guest corresponding to the VMCB 22 (the "Virtual Machine Run (VMRUN)" instruction), and other desired state may be loaded by the VMM 18 prior to executing the VMRUN instruction. Similarly, in such embodiments, only a portion of the processor state may be stored to the VMCB 22 by the processor on guest exit and the VMM 18 may be responsible for storing any additional state as needed. In other embodiments, the VMCB 22 may include a pointer to another memory area where the processor state is stored. Furthermore, in one embodiment, two or more exit mechanisms may be defined. In one embodiment, the amount of state stored and the location of state that is loaded may vary depending on which exit mechanism is selected.

In one embodiment, the VMM 18 may also have an area of memory allocated to store the processor state corresponding to the VMM 18. When the VMRUN is executed, the processor state corresponding to the VMM 18 may be saved in the area. When the guest exits to the VMM 18, the processor state from the area may be reloaded from the area to permit the VMM 18 to continue execution. In one implementation, for example, the processor may implement a register (e.g. a model specific register, or MSR) to store the address of the VMM 18 save area.

Additionally, the VMCB 22 may include an intercept configuration that identifies intercept events that are enabled for the guest, and the mechanism for exiting the guest if an enabled intercept event is detected. In one embodiment, the intercept configuration may include a set of intercept indications, one indication for each intercept event that the processor supports. The intercept indication may indicate whether or not the processor is to intercept the corresponding event (or, viewed in another way, whether or not the intercept is enabled). As used herein, an event is "intercepted" in a guest if, should the event occur in the guest, the processor exits the guest for processing of the event. In one embodiment, the intercept configuration may include a second set of indications which indicate which of two exit mechanisms are used. Other embodiments may define more than two exit mechanisms. In another embodiment, the intercept configuration may comprise one set of intercept indications, one per intercept event, that indicate whether or not a first exit mechanism should be used for the event; and a second set of intercept indications, one per intercept event, that indicate whether or not a second exit mechanism should be used for the event.

Generally, the exit mechanism may define the operations performed by the processor to exit guest execution (generally in a restartable fashion) and to begin executing other code. In one embodiment, one exit mechanism may include saving a small amount of processor state and loading state for a minivisor. The minivisor may execute "near" the guest (e.g. in the guest's address space), and may perform relatively simple intercept processing. Another exit mechanism may exit to the VMM, saving a larger amount of processor state and loading the VMM's processor state. Thus, intercept events may be processed by different instruction code depending on the event. Additionally, relatively simple intercept processing may be processed through a "lighter weight" exit mechanism which may take less time to perform, which may improve performance in some embodiments. More complicated processing may be performed in the VMM, after a "heavier weight" mechanism is used to exit. Thus, in this embodiment, the VMM 18 may configure the processor to intercept those events that the VMM 18 does not wish the guest 10A-10N to handle internally, and may also configure the processor for which exit mechanism to use. Events may include instructions (that is, intercept an instruction instead of executing it), interrupts, exceptions, and/or any other desired events that may occur during guest execution.

In one embodiment, the VMCB 22 may further include other control bits that may cause the processor to perform certain actions upon loading the VMCB 22. For example, the control bits may include indications to flush the TLB in the processor. Other control bits may specify the execution environment for the guest (e.g. interrupt handling modes, an address space identifier for the guest, etc.). Still other control bits may be used to communicate an exit code describing why the guest exited, etc.

Generally, a "guest" may comprise any one or more software programs that are to be virtualized for execution in the computer system 5. A guest may include at least some code that executes in privileged mode, and thus expects to have full control over the computer system on which it is executing. As mentioned previously, guest 10A is an example in which the guest includes a guest OS 12. The guest OS 12 may be any OS, such as any of the Windows OSs available from Microsoft Corp., (Redmond, Wash.), any UNIX-type operating system such as Linux, AIX from IBM Corporation (Armonk, N.Y.), Solaris from Sun Microsystems, Inc. (Santa Clara, Calif.), HP-UX from Hewlett-Packard Company (Palo Alto, Calif.), etc. The guest 10N is an example of a guest that comprises non-OS privileged code 16.

It is noted that the letter "N" when used herein in reference numerals such as 10N is meant to generically indicate any number of elements bearing that reference numeral (e.g. any number of guests 10A-10N, including one guest). Additionally, different reference numerals that use the letter "N" (e.g. 10N and 14N) are not intended to indicate like numbers of the different elements are provided (e.g. the number of guests 10A-10N may differ from the number of applications 14A-14N) unless otherwise noted.

In one embodiment, the processor(s) in the host hardware 20 may support an alternate address space when the VMM code (e.g. the VMM 18 and/or the minivisor, in embodiments that implement the minivisor) is being executed. The alternate address space may be the virtual address space of the guest which has most recently exited. Accordingly, if the VMM code needs to access memory that is accessed by the guest, the VMM code need not include instructions to locate the guest's page tables, process the page tables ("walk" the page tables) to identify the translation, walk the nested page tables (where implemented) and read the resulting physical address in memory. Instead, the VMM code may include an instruction that specifies the alternate address space for the access and the translation hardware may automatically translate the address through the page tables indicated by the alternate address space (e.g. the guest's page tables). Performance of the VMM code may be improved.

Minivisor Overview

The processor(s) in the host hardware 20 may support a world switch using at least two exit mechanisms from the guest, as mentioned above. Specifically, in one embodiment, each exit mechanism may include storing only a certain amount of the guest's processor state (and loading at least some corresponding state for the code to be executed after exit and/or setting state to predetermined values). That is, the amount saved/loaded by the processor may exclude at least some of the processor state. The amount stored in each mechanism may differ, and the amount stored in one mechanism may be greater than the amount stored in another mechanism. The amount of state stored and loaded automatically is generally correlated to the amount of time needed to perform the world switch, and thus is correlated to the performance of the computer system when executing virtual machines. The exit mechanism that stores a lesser amount of state may also be more limited in the processing that it can accomplish (at least without storing additional state) but may be used to perform certain processing that does not require as much state save.

Figure 2:
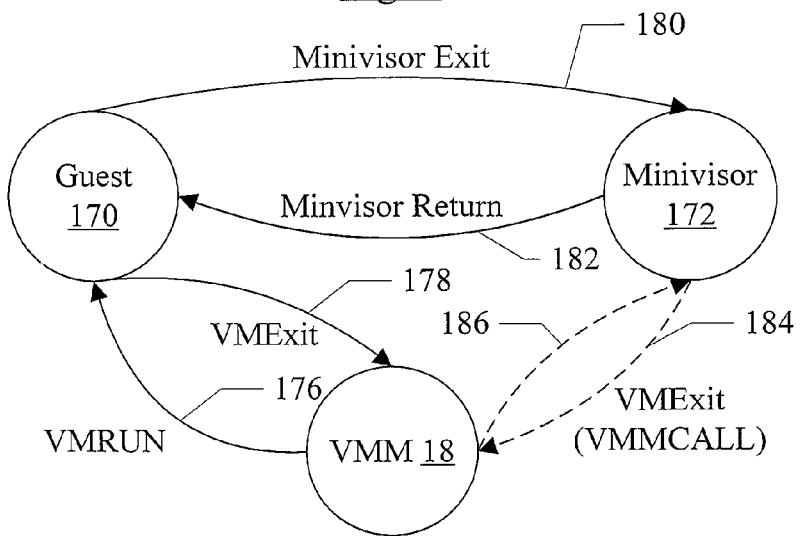
FIG. 2 is a block diagram of one embodiment of various modes that may be supported in the virtualization.

In one embodiment, the exit mechanism that stores less processor state may exit to a "minivisor". The exit mechanism that stores more processor state may be an exit to the VMM 18. FIG. 2 is a block diagram illustrating various transitions, for one embodiment. A guest 170 is shown, along with a minivisor 172 and the VMM 18. The guest 170 may be, e.g., one of the guests 10A-10N. Generally, a guest may be initiated by the VMM 18 using the VMRUN instruction (arrow 176). Execution of the VMRUN instruction may enable various intercept events, and may identify the exit for the enabled intercept events to either the minivisor 172 or the VMM 18. An exit to the VMM 18 (VMExit, arrow 178) may involve storing a relatively large amount of state. The VMM 18 may process the intercept and return to the guest 170 using the VMRUN instruction, similar to initiating the guest 170 (arrow 176). A minivisor intercept causes a minivisor (arrow 180), and may involve storing a relatively small amount of state and may invoke the minivisor 172. Additionally, in some embodiments, the minivisor exit may also set the XO-Valid bit in the processor, permitting execution in execute-only pages. The minivisor 172 may process the intercept event and return to the guest 170 (e.g. using the VMRUN instruction or some other minivisor return instruction, arrow 182). The minivisor return may also include clearing the XO-Valid bit. Thus, the minivisor code may be stored in execute-only pages and may be successfully executed via a minivisor exit. If the VMRUN instruction is used to return from the minivisor 172 to the guest 170, there may be an operand or other encoding that informs the processor that the VMRUN is executed in the minivisor 172, so that the proper processor state may be restored. In other embodiments, a different instruction may be used to return to the guest 170, or the VMRUN instruction may be used and a mode in the processor may indicate that the minivisor 172 is executing the VMRUN instruction.

In some embodiments, the minivisor 172 may detect that it is unable to process the intercept event. For example, the minivisor 172 may generally be capable of processing the event, but certain unlikely or infrequent event scenarios may require processing by the VMM 18. Or, the minivisor 172 may be incapable of processing the event but the intercept configuration may be erroneously programmed to exit to the minivisor 172. In such cases, the minivisor 172 may return to the guest 170, but may signal an intercept event that causes an exit to the VMM 18. Thus, the guest 170 may exit again, this time to the VMM 18. Alternatively, the minivisor 172 may have a mechanism for exiting to the VMM 18 (arrow 184). For example, in one embodiment, a VMMCALL instruction may be supported for guests to signal an exit to the VMM 18 (e.g. for paravirtualization). The minivisor 172 may use such an instruction to exit to the VMM 18. The same VMExit mechanism used to exit from the guest 170 to the VMM 18 may be used to exit from the minivisor 172 to the VMM 18, or a different mechanism may be used. In some embodiments, the minivisor may execute a modified form of a VMSAVE instruction (described below) to save remaining state that was not saved on the minivisor intercept, and may execute the VMMCALL or another instruction to transfer control to the VMM 18. The VMSAVE instruction may be defined to store additional processor state that is not easily accessible to software but which may not always need to be saved on a VMExit. The modified form of the VMSAVE instruction may save the processor state that is not stored on a minivisor intercept but is stored on the VMExit. The modified form may or may not also store the additional processor state that the unmodified form of the VMSAVE would store, in various embodiments.

The VMM 18 may process the intercept event, and may return to the guest 170 using the VMRUN instruction. Alternatively, the VMM 18 may be configured to return to the minivisor 172 (arrow 186), using the VMRUN instruction or a different instruction.

In some embodiments, the amount of state stored on VMExit may be less than the total processor state. Thus, the VMExit amount of state may be an intermediate amount that may be sufficient for some types of processing. In other cases, the VMM 18 may save/load additional processor state as needed. However, since only a portion of the state is automatically saved/loaded, the VMM 18 may have flexibility in how much additional state is saved/loaded and thus how much additional processing time is expended in the additional state save/load.

In some embodiments, the processor(s) may support additional instructions defined to save/load additional state to/from the VMCBs 22. These instructions will be referred to herein as the VMLOAD and VMSAVE instructions. The VMLOAD instruction is defined to load additional state from a VMCB 22 to the processor, and the VMSAVE instruction is defined to save additional state to the VMCB 22. For example, in some embodiments, the processor state may include "hidden state" in some registers. As used herein, hidden state is state saved in a processor register that is not directly readable via instruction execution. For example, in the x86 instruction set architecture, the segment registers have a non-hidden portion into which a segment selector identifying a segment descriptor in a segment descriptor table is loaded. Additionally, information from the segment descriptor (or derived from the segment descriptor) is loaded into a hidden portion of the segment register when a segment selector is loaded. The non-hidden portion may also be read from the register via instruction execution (e.g. to be stored to memory), but the hidden portion storing the segment descriptor information cannot be directly read via instruction execution according to the x86 instruction set architecture. In some embodiments, the VMLOAD/VMSAVE instructions may be defined to load/save the hidden state from/to the VMCB 22.

In other embodiments, the VMLOAD/VMSAVE instructions may be defined to load/save the state of two or more control registers that involve serialization in the processor when changed (e.g. paging control registers, mode control registers, etc.). That is, the processor may permit the pipeline to drain of any other instructions, wait for speculative execution of operations to complete, etc. before changing the control registers. While each control register is typically readable/writeable using an individual instruction, repeatedly serializing for such individual read/write operations may be slower than having a single instruction that reads/writes multiple control registers. In other embodiments, the VMLOAD/VMSAVE instructions may load/save hidden state and state corresponding to two or more control registers. In still other embodiments, the VMLOAD/VMSAVE instructions may load/save all processor state not loaded/saved by the processor hardware during the switch, or may load/save any subset of the processor state.

As used herein, saving processor state may refer to transferring the processor state from the processor to a storage location (e.g. in memory). The processor state in the processor may not be changed due to the saving. Additionally, restoring processor state may refer to transferring the state from the storage location to the processor. The processor state in the storage location may not be changed due to the restoring.

For convenience and brevity in the remainder of this description, the portion of the processor state that is saved/loaded during a world switch to/from the VMM 18 may be referred to as the VMExit partial state. The portion of the processor state that is saved/loaded during a world switch from the guest 10A-10N to the minivisor 172 may be referred to as the minivisor partial state.

Execute-Only Pages and Entry to Execute-Only Code

Turning now to FIG. 3A, a block diagram of an embodiment of a page table entry 74 which may be used in one embodiment of a processor, and a truth table 76 for certain bits defined in the page table entry 74. The page table entry 74 may be compatible with the extended page table entries defined in the x86 instruction set architecture. A set of page tables includes multiple entries 74 arranged in a data structure that is located by a page table base address register (the extended page table pointer register, or EPTP) in the processor.

The extended page tables are used to translate guest physical addresses to host physical addresses. Generally, the entry 74 includes an address (either of the page to which the guest physical address maps, or to another set of page table entries that are indexed by additional guest physical address bits to select another entry 74 in the hierarchical paging mechanism defined in x86), and some of the least significant bits of the address field may be required to be zero or may be ignored, depending on the page size. Additionally, some fields are available for software use, an EPT page type is defined, and the execute (X), write (W), and read (R) bits are included as shown in FIG. 3A. As illustrated in the table 76, the X, W, and R bits define the access to the page indicated by the address field. Specifically, if the X bit is set, execution is permitted from the page and if the X bit is clear, execution is not permitted from the page. Similarly, if the W bit is set, writes are permitted to the page and if the W bit is clear, writes are not permitted to the page; and if the R bit is set, reads are permitted to the page and if the R bit is clear, reads are not permitted to the page. Accordingly, if all three bits are clear, the page is not present. Similarly, an execute-only encoding is possible if X=1, W=0, and R=0. Some encodings may not be supported and may cause a page fault. For example, write only and execute/write may not be supported, in some embodiments.

Turning now to FIG. 3B, a block diagram of another embodiment of a page table entry 70 which may be used in one embodiment of a processor, and a truth table 72 for certain bits defined in the page table entry 70. The page table entry 70 may be compatible with the page table entries defined in the x86 instruction set architecture when physical address extension (PAE) is enabled in the processor. A set of page tables includes multiple entries 70 arranged in a data structure that is located by the page table base address register (CR3) in the processor.

The entry 70 includes a no execute (NX) bit, a read bit (R), a write bit (W), and a present bit (P). The present bit is essentially a valid bit for the entry 70, indicating whether or not the entry is present in the page tables. In a standard x86 page table entry, the present bit is also a defacto read bit, indicating that the page identified by the address field is readable. That is, any page indicated by a present page table entry is readable. In the embodiment of FIG. 3B, however, an explicit read bit is included to indicate whether or not the page is readable. The write bit (in the position of the entry 70 previously occupied by the R/W bit, in this embodiment) indicates whether or not the page is writeable. The no execute bit indicates whether or not instruction execution is permitted in the page.

The truth table 72 indicates the combinations of the present bit, the write bit, the read bit, and the no execute bit and the meaning of the combinations, for one embodiment. If the P bit is clear, the remaining bits are ignored and the page is not present. Any attempt to access the page results in a page fault. If the P bit is set, the W and R bits are clear, and the NX bit is set, then the page is present but no access is permitted (no read, no write, and no execute). Accordingly, any attempted access to the page causes a page fault. The remaining combinations of the P bit set and the other three bits as indicated in the truth table 72 permit various combinations of read, write, and execute access to the corresponding page. If the W bit is set, write access is permitted. If the R bit is set, read access is permitted. If the NX bit is clear, execute access is permitted. Attempts to perform a non-permitted access may result in a page fault.

Specifically, the encoding having the P bit set and the R, W, and NX bits clear provides an execute-only page. Access to the page identified by the address field for execution may be permitted, but not reading and writing of the page. Accordingly, the VMM 18 may use the execute-only encoding for pages storing the minivisor or other trusted code.

In other embodiments, other bits may be defined. For example, the read bit may be a not readable (NR) bit with the opposite meanings of the set and clear states as the read bit has in FIG. 3. Similarly, a non writeable (NW) bit may be defined, and an execution (X) bit may be defined having opposite meanings of the set and clear states as compared to the W and NX bits, respectively. Additionally, encodings using three bits may be supported.

In the illustrated embodiment, the R bit is defined as one of the available bits from the field of bits 62 to 52 in the entry 70. One of the available bits in the field of 11 to 9 could also be used, or the PAT bit or the G bit could be redefined in some embodiments.

As mentioned previously, the address field (bits 51 to 12, in the embodiment of FIG. 3) may store an address of the page identified by the entry 70. In one embodiment, the page table entry 70 may be part of a hierarchical paging scheme in which a first level of the page tables is accessed based on the most significant bits of the virtual address and the page table base address, and the corresponding address field in the page table entry identifies the next level of the page tables and additional virtual address bits are used to identify a page table entry in the second level, etc. until all translated virtual address bits have been used. The number of levels depends on the page size as well as the number of virtual address bits. In one embodiment, various page sizes may be supported depending on different processor modes. For example, a 4 kilobyte page size, a 2 Megabyte page size, a 4 Megabyte page size, and a 1 Gigabyte page size may be supported in various embodiments. Other embodiments may support any page size or any combination of page sizes. The address field supports as small as a 4 kilobyte page size. If larger page sizes are used, some of the least significant bits of the address field may be don't cares or may be required to be zero.

Figure 4:
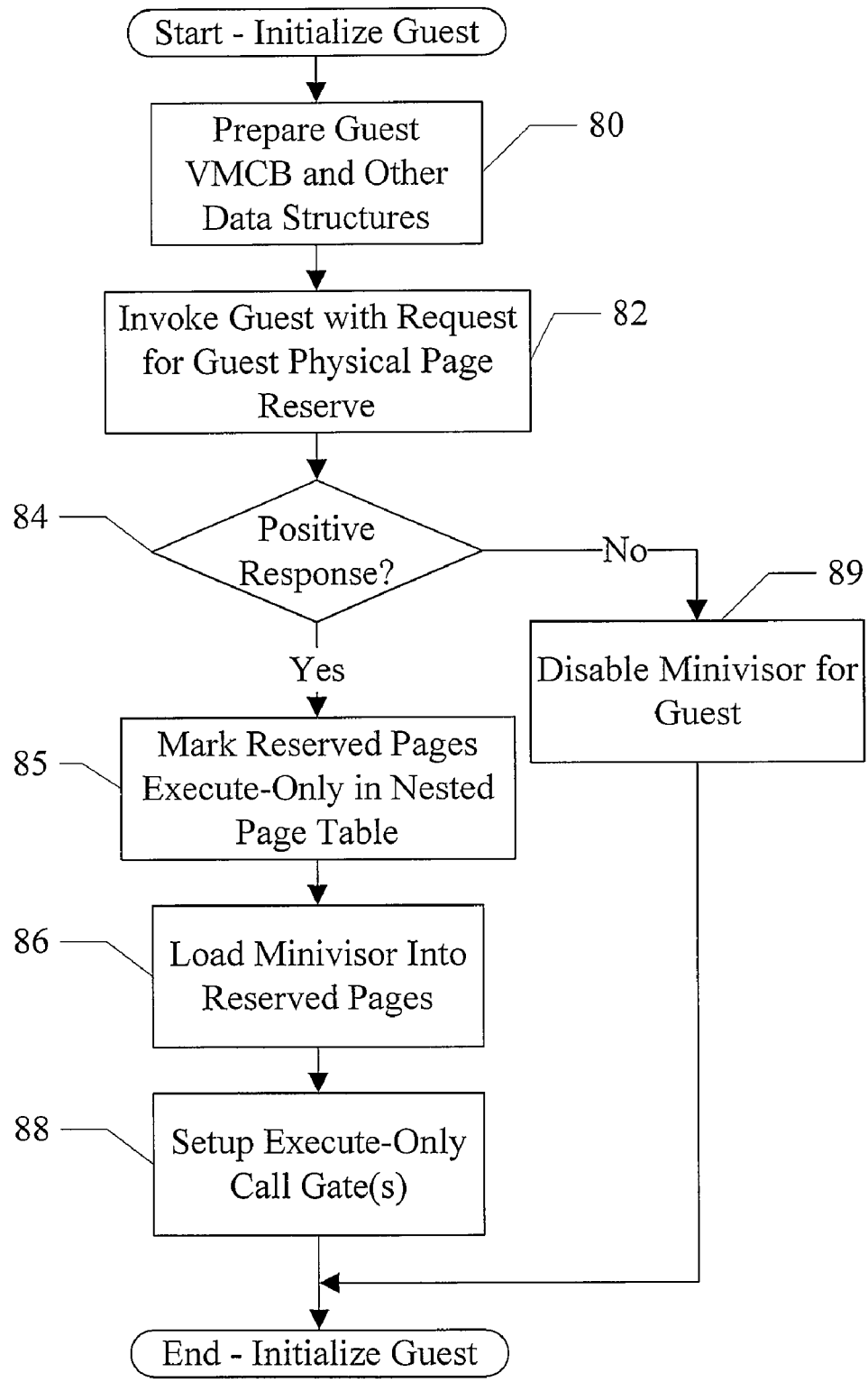
FIG. 4 is a flowchart illustrating one embodiment of initializing a guest.

Turning now to FIG. 4, a flowchart is shown illustrating operation of one embodiment of the VMM 18 to initialize a guest. While the blocks are shown in a particular order for ease of understanding, other orders may be used. The VMM 18 may comprise instructions which, when executed, implement the operation illustrated in FIG. 4.

The VMM 18 may prepare the guest's VMCB 22 with initial processor state for the guest. Any additional data structures that the VMM 18 may use to track the guest or to store state related to the guest may also be initialized (block 80). The VMM 18 may then invoke the guest with a request for the guest to reserve one or more pages for the VMM's use (block 82). The number of pages requested may depend on the size of the minivisor code and any data structures the minivisor may use. The requested pages may be guest physical pages, which may be translated to host physical pages through the nested page tables (in one embodiment) or may be bypassed via shadow page tables. If the guest exits with a positive response for the reserved pages, indicating that the requested number of pages have been reserved (decision block 84, "yes" leg), the response from the guest may include an identification of the reserved pages (e.g. by guest physical address). The VMM 18 may map the reserved pages to host physical pages (block 85) in the nested page tables, marking the pages execute-only. The VMM 18 may load the minivisor 172 into the host physical pages to which the reserved pages are mapped (block 86). Alternatively, the minivisor and/or other trusted code may be loaded into the guest virtual address space. In such embodiments, the guest may be responsible for mapping the guest virtual pages to the guest physical pages reserved for the execute-only code, and the guest may return both guest virtual and guest physical pages to the VMM 18 as the response to the page reserve request. In embodiments in which the guest may make calls to the minivisor, the VMM 18 may also set up execute-only call gates for the calls (block 88). There may be one XO call gate instance for each entry point into the minivisor 172. If, on the other hand, there is not a positive response from the guest to reserve the pages (decision block 84, "no" leg), the VMM 18 may disable the minivisor 172 (or any other trusted code to be injected in guests) for that guest (block 89). All intercepts may exit with a VMExit to the VMM 18 in such a case. Alternatively, other mechanisms may be used to inject a minivisor/other trusted code into the guest in addition to or instead of using the execute-only mechanism. For example, minivisor pages may be marked as supervisor pages, which may be inaccessible to a guest that runs in user mode (CPL3, in x86).

Figure 5:
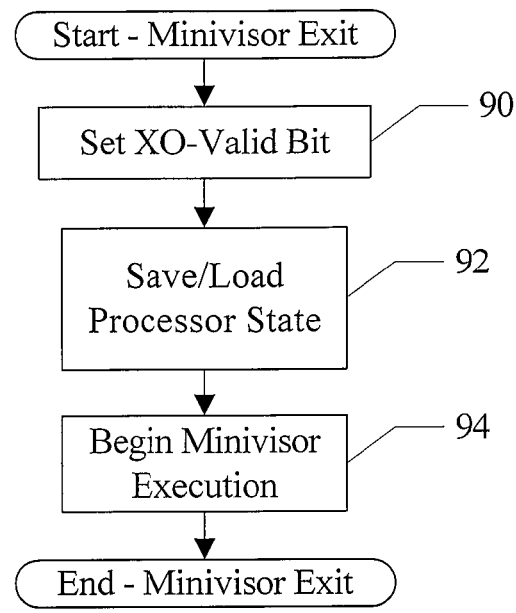
FIG. 5 is a flowchart illustrating operation of one embodiment of a processor in response to a minivisor exit.

Turning next to FIG. 5, a flowchart is shown illustrating operation of one embodiment of a processor in response to a minivisor exit. While the blocks are shown in a particular order for ease of understanding, other orders may be used. Blocks may be performed in parallel by combinatorial logic within the processor. Blocks, combinations of blocks, and/or the flowchart as a whole may be pipelined over multiple clock cycles. Blocks may be performed in microcode as well.

In response to the minivisor exit, the processor may set the XO-Valid bit (block 90), save the partial processor state for a minivisor exit and load the corresponding minivisor processor state (block 92), and begin minivisor execution in the execute-only pages (block 94).

Figure 6:
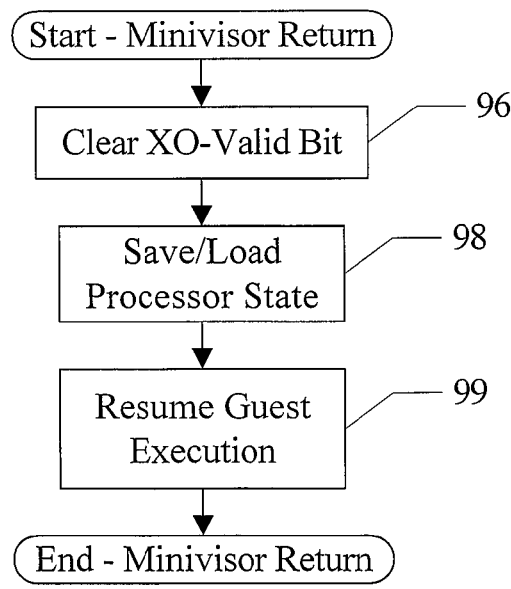
FIG. 6 is a flowchart illustrating operation of one embodiment of a processor in response to a return from the minivisor to the guest.

Turning next to FIG. 6, a flowchart is shown illustrating operation of one embodiment of a processor in response to a minivisor return (i.e. a return from the minivisor to the guest). While the blocks are shown in a particular order for ease of understanding, other orders may be used. Blocks may be performed in parallel by combinatorial logic within the processor. Blocks, combinations of blocks, and/or the flowchart as a whole may be pipelined over multiple clock cycles. Blocks may be performed in microcode as well.

In response to the minivisor return, the processor may clear the XO-Valid bit (block 96), save the minivisor processor state and load the corresponding guest processor state (block 98), and resume guest execution (block 99).

Figure 7:
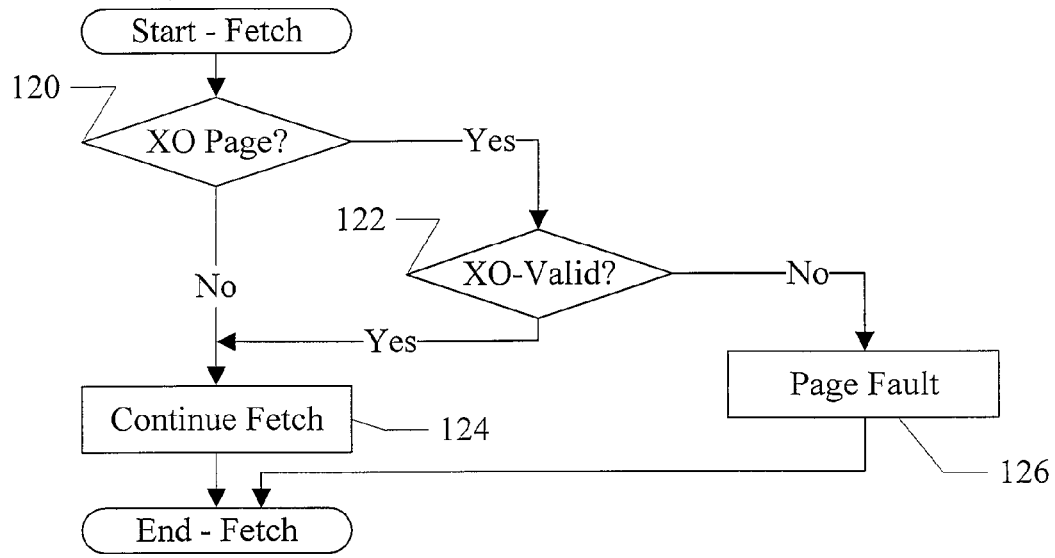
FIG. 7 is a flowchart illustrating operation of one embodiment of a processor to fetch instructions.

Turning now to FIG. 7, a flowchart is shown illustrating operation of one embodiment of a processor to process an instruction fetch. While the blocks are shown in a particular order for ease of understanding, other orders may be used. Blocks may be performed in parallel by combinatorial logic within the processor. Blocks, combinations of blocks, and/or the flowchart as a whole may be pipelined over multiple clock cycles. Blocks may be performed in microcode as well.

The instruction fetch address may be translated (either through a translation lookaside buffer or table walk). If the fetch is to an execute-only page (decision block 120, "yes" leg), and the XO-Valid bit is set (decision block 122, "yes" leg), the processor may continue the instruction fetch, fetching instructions from the execute-only page for execution (block 124). If the fetch is not to an execute-only page (decision block 120, "no" leg), the fetch may also continue normally (block 124). If the fetch is to an execute-only page (decision block 120, "yes" leg), and the XO-Valid bit is clear (decision block 122, "no" leg), the processor may take a page fault for the fetch (block 126). In some embodiments, the page fault may be separately intercepted, via the intercepts in the VMCB 22 for the guest. The VMM 18 (and/or the minivisor 172) may handle the page fault.

Figure 8:
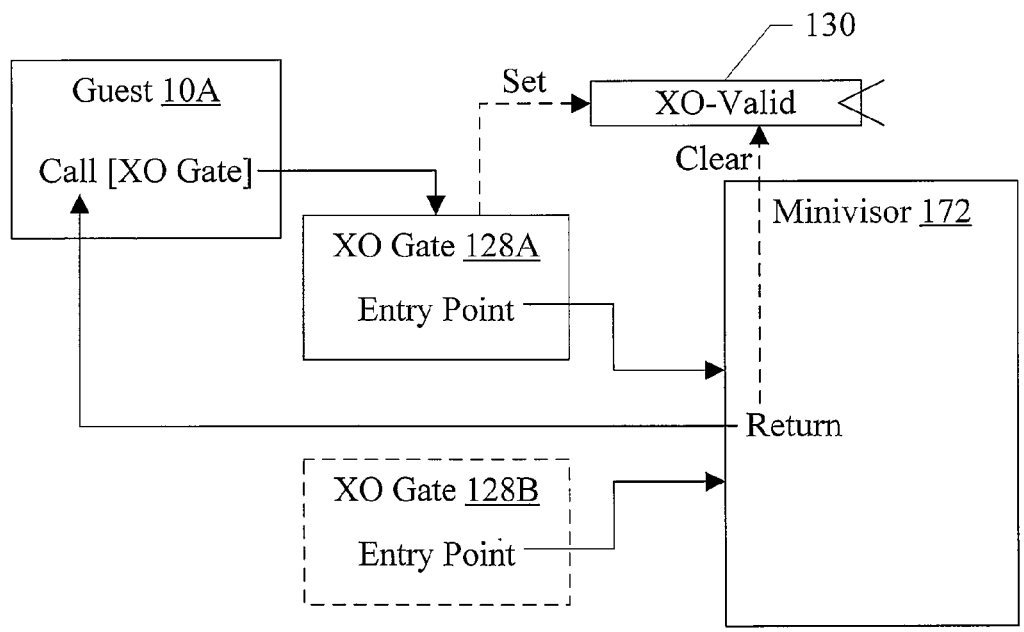
FIG. 8 is a block diagram illustrating one embodiment of controlled access to the minivisor.

Turning now to FIG. 8, a block diagram is shown illustrating the use of XO call gates to permit a guest 10A to make a call to the minivisor 172, for one embodiment. The guest 10A includes a call instruction that specifies an XO gate 128A. The XO gate 128A includes an entry point into the minivisor 172 (an address of the first instruction of the routine to be executed). Additionally, as the processor processes the XO gate 128A, the processor sets the XO-Valid bit in the register 130. Execution in the minivisor 172 at the requested entry point may begin. Subsequently, a return to the guest 10A is encountered in the minivisor 172. In response to the return, the processor clears the XO-Valid bit in the register 130 and returns to the instruction in the guest 10A that follows the call instruction. There may be one instance of the call gate for each entry point in the minivisor 172. For example, in FIG. 8, an XO gate 128B is shown for another entry point.

The register 130 may be a hidden register in the processor that is not programmer visible, in one embodiment. That is, there may be no instructions that are defined to read or write the register 130. Alternatively, the register 130 may be programmer visible in other embodiments. The instruction(s) which update the register 130 may be privileged to prevent updates by the guest 10A.

Implementation Details, One Embodiment

Figure 9:
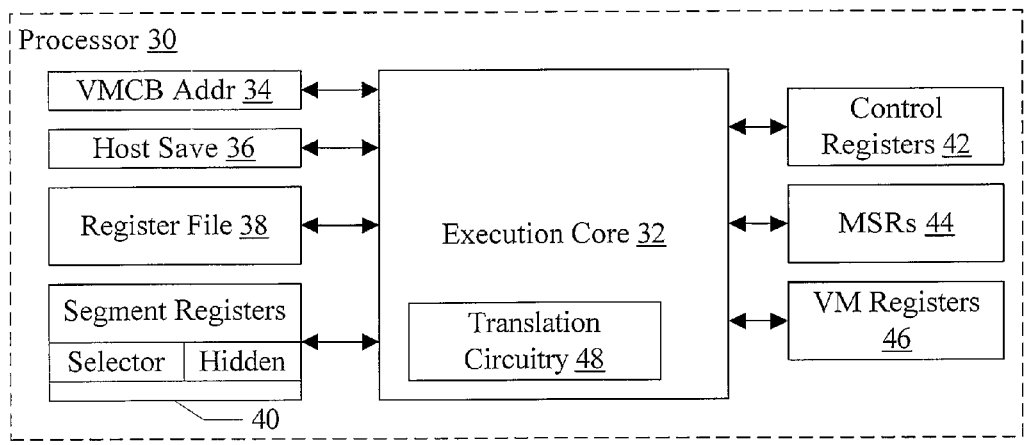
FIG. 9 is a block diagram of a portion of one embodiment of a processor.

FIG. 9 is a block diagram illustrating one embodiment of a processor 30 that may be included in the host hardware 20 and may provide support for world switch using multiple exit mechanisms as mentioned above and the execute-only memory for the minivisor as described above. In the illustrated embodiment, the processor 30 includes an execution core 32, a VMCB address register 34, a host save register 36, a register file 38, a set of segment registers 40, a set of control registers 42, a set of model specific registers (MSRs) 44, and a set of virtual machine (VM) registers 46. The execution core 32 is coupled to each of the registers 34, 36, 38, 40, 42, 44, and 46.

Generally, the execution core 32 is configured to execute the instructions defined in the instruction set architecture implemented by the processor 30 (e.g. the x86 instruction set architecture, including AMD64™ extensions, in some embodiments). The execution core 32 may employ any construction. For example, the execution core 32 may be a super-pipelined core, a superscalar core, or a combination thereof in various embodiments. Alternatively, the execution core 32 may be a scalar core, a pipelined core, a non-pipelined core, etc. The execution core 32 may employ out of order speculative execution or in order execution in various embodiments. The execution core 32 may include microcoding for one or more instructions or other functions, in combination with any of the above constructions. The execution core 32 may also include translation circuitry 48 that performs address translation according to an address translation mechanism defined for the processor 30. In one embodiment, the address translation mechanism may include nested paging to support guests. In nested paging, the processor may support a set of page tables for each guest (translating from guest virtual to guest physical addresses) and another set of page tables (translating from guest physical to host physical addresses). Thus, a tablewalk initiated during guest execution may walk two sets of page tables when nested paging is used.

In one embodiment, the translation circuitry 48 may include a translation lookaside buffer (TLB) configured to cache the results of translations. The TLB may store the portion of the input address that gets translated (guest virtual or guest physical) and the corresponding portion of the resulting translated address (host physical). The portion may be the input/output address with the exception of the least significant bits that form an offset within the page. The page is the unit of translation, and may vary in size.

When executing a VMRUN instruction (described above and in more detail below), the execution core 32 may save the address of the VMCB identified by the VMRUN instruction in the VMCB address register 34. Subsequently, during a guest exit, the execution core 32 may save the partial processor state to the VMCB indicated by the VMCB address register 34. The amount of processor state saved depends on the exit mechanism being used for the detected intercept event. The host save register 36 may store an address of a host save area in which host processor state (e.g. corresponding to the VMM 18) may be saved. The execution core 32 may save VMExit partial processor state in the host save area during execution of the VMRUN instruction, and may load VMExit partial processor state from the host save area during a guest exit to the VMM 18.

In one embodiment, the minivisor partial processor state may be stored in the VMCB 22 of a given guest, in addition to the partial processor state corresponding to the guest itself. Accordingly, guest exit to the minivisor 172 may include storing the minivisor partial processor state to the VMCB 22 and loading the minivisor state from the VMCB 22.

The register file 38 may comprise various registers defined for use with the instructions that the execution core 32 is configured to execute. For example, the register file 38 may comprise integer registers, floating point registers, multimedia registers, etc.

The segment registers 40 may be provided in accordance with the x86 instruction set architecture. More particularly, the segment registers 40 may be part of the privilege protection mechanism employed by the processor 30 when the processor is in protected mode. In protected mode, each segment register 40 may be loaded with a segment selector using a segment load instruction. The segment selector identifies a segment descriptor in a segment descriptor table in memory that sets the privilege level for the segment and also includes other protection control bits and other information. When a segment selector is loaded into a segment register 40, the execution core 32 loads the segment descriptor from the segment descriptor table and loads the descriptor information, or information derived from the segment descriptor, into a hidden portion of the segment register. An exemplary segment register is illustrated in the segment registers 40, with a selector field and a hidden field.

The control registers 42 may comprise a variety of control registers that describe the general operating mode of the processor 30. The control registers, for example, may include various control bits that control protected mode, whether or not paging is enabled, various paging/protected mode options, interrupt enable indications and handling, base addresses of various tables used by the processor such as the segment descriptor tables, the page tables, etc. The definition of the control registers 42 varies from instruction set architecture to instruction set architecture. In embodiments implementing the x86 instruction set architecture (including AMD64 extensions, if desired), the control registers 42 may include CR0, CR3, CR4, the local descriptor table register (LDTR), the global descriptor table register (GDTR), the interrupt descriptor table register (IDTR), the extended feature enable register (EFER), the debug registers, the task register (TR), the system call registers (STAR, LSTAR, CSTAR, SFMASK, etc.), etc. In some embodiments, the register 130 (FIG. 8) may be a control register.

The MSRs 44 may comprise one or more registers that are implementation dependent. That is, the instruction set architecture may permit a given implementation to define any set of MSRs 44 that may be desirable for that implementation. In some embodiments, the register 130 (FIG. 8) may be an MSR.

The VM registers 46 comprise one or more registers that are included in the processor 30 to provide virtual machine support (that is, to support virtualization for the guests 10A-10N). The VMCB address register 34 and the host save register 36 may be considered to be VM registers 46, but have been shown separately in FIG. 3 to illustrate the world switch functionality of the processor 30 (in conjunction with the flowchart discussed below). For example, the VM registers 46 may include registers that may be loaded with virtual interrupt state to permit an interrupt to be injected into a guest. The VM registers 46 may also include an intercepts register or registers. The intercept register or registers may store the intercept configuration. The execution core 32 may be configured to monitor for various intercepts indicated in the intercepts register, and to exit using the exit mechanism as indicated in the intercepts register. The intercepts register may be loaded from the VMCB 22 of a guest 10A-10N when execution of that guest 10A-10N is initiated (e.g. using the VMRUN instruction described above). Other VM registers 46 may be included to virtualize various other processor state, system resources, etc. In some embodiments, some or all of the VM registers 46 may be defined as MSRs. In some embodiments, the register 130 may be a VM register.

As used herein, the term register refers to any storage location implemented in the processor that is addressable (or otherwise accessible) using an instruction. Registers may be implemented in various fashions. For example, registers may be implemented as any sort of clocked storage devices such as flops, latches, etc. Registers may also be implemented as memory arrays, where a register address may be used to select an entry in the array. The register file 38 may be implemented in such a fashion, in some embodiments. Any combination of implementations may be used in various embodiments of the processor 30.

The various registers 34, 36, 38, 40, 42, 44, and 46 may comprise processor state in one embodiment. Any other registers may be implemented in other embodiments that may be part of the processor state, as desired.

Figure 10:
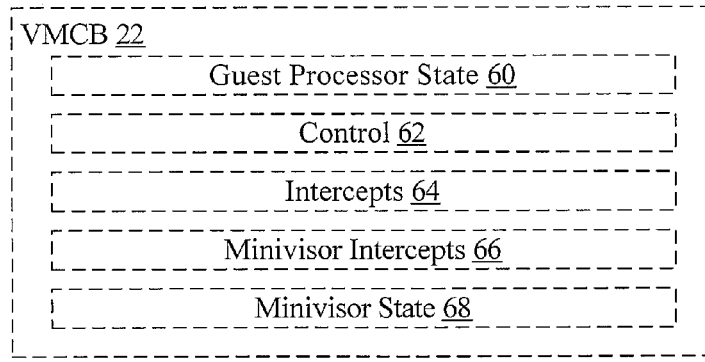
FIG. 10 is a block diagram of one embodiment of a virtual machine control block.

FIG. 10 is a block diagram of one embodiment of a VMCB 22. In the embodiment of FIG. 10, the VMCB 22 may include a guest processor state 60, control data 62, intercepts 64, minivisor intercepts 66, and minivisor state 68. As mentioned previously, the guest processor state 60 may include various architected state that corresponds to the processor state at the point at which the guest last exited. The guest processor state 60 may also include implementation-specific state (e.g. model specific registers). For example, the guest processor state 60 may include implementation-specific state and/or architected state that is considered part of the processor's context. The guest processor state 60 may correspond to an initial state of the processor if the guest has not yet executed. The processor 30 may load processor state of the processor 30 from the guest processor state 60 during execution of the VMRUN instruction. The processor 30 may save processor state from the processor 30 to the guest processor state 60 during the guest exit. The guest processor state 60 may be defined to store all the processor state, even though the processor 30 only saves/loads partial state as described above. Other state may be saved/loaded by the VMM 18 and/or the minivisor 172 as needed. In other embodiments, the guest processor state 60 may not be defined to store all processor state. Processor state not stored in the guest processor state 60 may be saved by the VMM 18 in other memory locations (or may be recreated by the VMM 18). Any subset of processor state may be included in the guest processor state 60.

The control data 62 may include any desired control information to be used when execution of the corresponding guest is initiated or exited. As mentioned previously, the control data 62 may include a guest exit code written by the processor 30 upon guest exit to indicate the reason for guest exit. The intercepts 64 may specify which events are enabled for intercept (causing an exit from the guest). The intercepts 64 may define exits to the VMM 18, using the VMExit mechanism. Similarly, the minivisor intercepts 66 may specify which events are enabled for intercept, causing a guest exit to the minivisor 172. In other embodiments, the intercepts 64 may specify which intercept events are enabled for intercept, and the intercepts 66 may indicate which exit mechanism to use (VMExit or minivisor exit). Various intercepts may be defined in various embodiments. In one embodiment, at least some of the intercepts are defined as intercept indications in the intercepts 64. Each intercept indication may, e.g., be a bit which may enable the intercept when set or disable the intercept when clear. Other embodiments may assign the opposite meanings to the states of the bit or may use other indications. There may be one intercept indication in the intercepts 64 and one intercept indication in the intercepts 66 for each intercept event. Thus, the intercepts 64 and 66 may comprise one embodiment of an intercept configuration.

The minivisor state 68 may comprise the processor state corresponding to the minivisor 172. The minivisor state 68 may be smaller than the guest processor state 60, in general. In other embodiments, the minivisor state 68 may be stored in a separate data structure than the VMCB 22. In embodiments implementing the minivisor page table base address register, the minivisor page table base address register may be considered part of the minivisor state 68.

Figure 11:
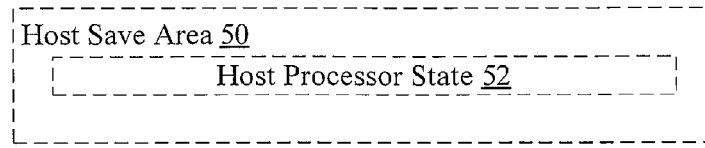
FIG. 11 is a block diagram of one embodiment of a host save area.

FIG. 11 is a block diagram of one embodiment of a host save area 50 that may be used to store host processor state 52. The host processor state 52, similar to the guest processor state 60, may be defined to store all the processor state that is considered part of the context. However, the host processor state 52 may correspond to the VMM 18 (and other host code, such as a host O/S, in some embodiments). In other embodiments, the host processor state 52 may not be defined to store all the processor state. The host processor state 52 may be defined the same as the guest processor state 60 in some embodiments. The processor 30 may save processor state from the processor 30 to the host processor state 52 during execution of the VMRUN instruction, and may load processor state to the processor 30 from the host processor state 52 during a guest exit to the VMM 18. The host save register 36 may store an address that locates the host save area 50.

FIG. 12 is a pair of tables 100 and 102 illustrating the VMExit partial processor state saved and loaded according to one embodiment of the processor 30 that implements the x86 instruction set architecture (including the AMD64 extensions). The register names used in the tables 100 and 102 correspond to the names used in the x86 instruction set architecture with AMD64 extensions. Other embodiments may save/load any partial processor state, including any subset or superset of the state shown.

Table 100 shows the partial host state that is saved during execution of the VMRUN instruction and loaded during guest exit to the VMM 18 for the present embodiment. In the illustrated embodiment, the partial host state includes: the CS segment selector and the instruction pointer of the next instruction in the host after the VMRUN instruction (next RIP); the flags (RFLAGS); the RAX register; the SS segment selector; the current stack pointer (RSP); the control registers CR0, CR3, CR4, and EFER; the interrupt descriptor table register (IDTR); the global descriptor table register (GDTR); the ES segment selector; and the DS segment selector.

Table 102 shows the partial guest state that is loaded during execution of the VMRUN instruction and saved during guest exit to the VMM 18 for the present embodiment. In the illustrated embodiment, the same processor state shown in table 100 is saved/loaded. Additionally, the hidden portion of the CS, DS, ES, and SS segment registers is saved/loaded as well as the debug registers DR6 and DR7 and the VM registers 46. Thus, in this embodiment, the partial state saved/loaded for a host and the partial state saved/loaded for a guest during a switch overlap but are not identical. In other embodiments, the same partial state may be saved/loaded for host and guest, or other overlapping subsets of processor state may be saved/loaded.

FIG. 13 is a pair of tables 104 and 106 illustrating the minivisor partial processor state saved and loaded for a minivisor intercept and a minivisor return, respectively, according to one embodiment of the processor 30 that implements the x86 instruction set architecture (including the AMD64 extensions). The register names used in the tables 104 and 106 correspond to the names used in the x86 instruction set architecture with AMD64 extensions, except that the names are preceded, in some cases, by a lower case "g" or a lower case "m". The lower case "g" refers to guest processor state, and the lower case "m" refers to minivisor processor state. Other embodiments may save/load any partial processor state, including any subset or superset of the state shown.

Table 104 illustrates state changes for a minivisor intercept (arrow 180 in FIG. 2). State saved to the VMCB 22 includes the following guest state: the RIP, the RSP, the guest mode, the IDT configuration, RAX, the current privilege level (CPL), and the CS segment selector and hidden portion. The guest state is stored into the guest processor state 60 of the VMCB 22. State loaded from the VMCB 22 (from the minivisor state 68) includes the RIP (which points to the initial instruction of the minivisor 172, and is the same each time the minivisor 172 is entered), the RSP, and the IDT configuration. Additionally, the processor 30 may force certain state to predefined values. The global interrupt flag (GIF) may be cleared; the CPL may be set to 0 (most privileged), the processor mode may be placed in long mode (the 64 bit extension mode of AMD64); the RAX may be set to the address of the VMCB, from the register 34; the intercept configuration may be cleared (so that no intercepts are enabled); a mode bit or bits indicating minivisor mode may be set (in some embodiments implementing such bits); and the host segment context may be loaded. One of the mode bits that may be set is the XO-Valid bit, if execute-only pages are used for the minivisor 172.

Table 106 illustrates state changes for a minivisor return to the guest (arrow 182 in FIG. 2). The RSP of the minivisor 172 may be saved back to the minivisor state 68 of the VMCB 22. The RIP is not stored because the minivisor 172 may be entered at the same point each time (the instruction indicated by the RIP), not from the exit point. The IDT configuration may not be subject to change by the minivisor 172, and thus also need not be saved. The same state that was stored to the VMCB 22 (in the guest processor state 60) is loaded from the VMCB 22. Additionally, the intercept configuration (e.g. intercepts 64 and 66) may be restored from the VMCB. The GIF may be set; and the minivisor mode bits (if implemented) may be cleared. One of the mode bits that may be cleared is the XO-Valid bit.

Accordingly, comparing tables 104-106 to tables 100-102, less state is stored and loaded for a minivisor exit mechanism than for a VMExit exit mechanism. Accordingly, the minivisor exit mechanism may be lighter weight, and may be lower latency than the VMExit exit mechanism, in some embodiments.

Figure 14:
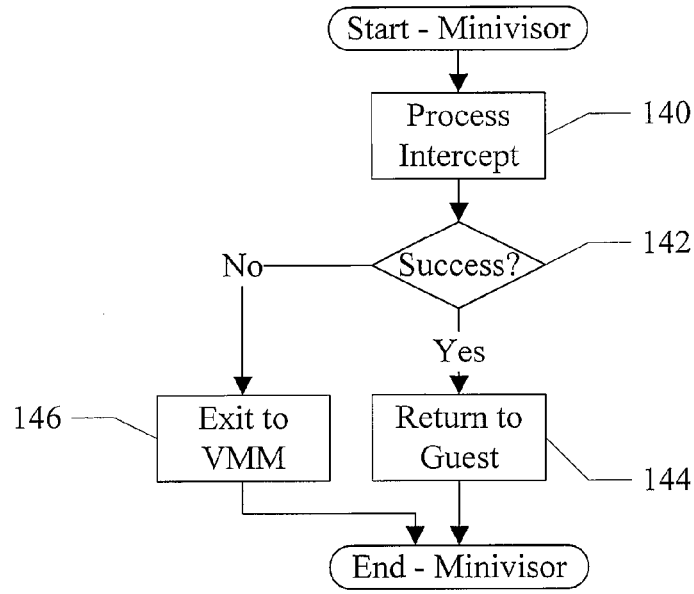
FIG. 14 is a flowchart illustrating operation of one embodiment of a minivisor.

FIG. 14 is a high level flowchart illustrating one embodiment of the execution of the minivisor 172. The details of a given minivisor 172 are implementation-specific. Any set of intercept processing may be implemented. The minivisor 172 may comprise instructions which, when executed, implement the operation of FIG. 14.

The minivisor 172 may process the detected intercept event (block 140). Generally, processing an intercept event may comprise taking any actions that are needed to ensure that the guest may continue executing correctly when the minivisor 172 returns. The processing may include emulating the intercepted event. For example, if the intercepted event is an instruction, the minivisor 172 may emulate the instruction (possibly updating processor state, like target registers, with the result or updating memory with a result). If the intercept event is an exception, processing the intercept event may include handling the exception.

If the minivisor 172 successfully processes the intercept event (decision block 142, "yes" leg), the minivisor 172 may return to the guest 170 (block 144). As mentioned previously, returning to the guest 170 may include clearing the XO-Valid bit in the register 130. If the minivisor 172 is unsuccessful in processing the intercept event (decision block 142, "no" leg), the minivisor 172 may cause an exit to the VMM 18 (block 146). The exit may occur in various fashions. The minivisor 172 may be configured to exit directly to the VMM 18 (e.g. using the VMMCALL instruction), or may be configured to return to the guest 170 with an intercept flagged that will cause an exit to the VMM 18 from the guest. For example, the minivisor 172 may modify the intercept configuration so that the intercept event that caused the exit to the minivisor 172 is configured to use the VMExit mechanism to exit to the VMM 18.

Figure 15:
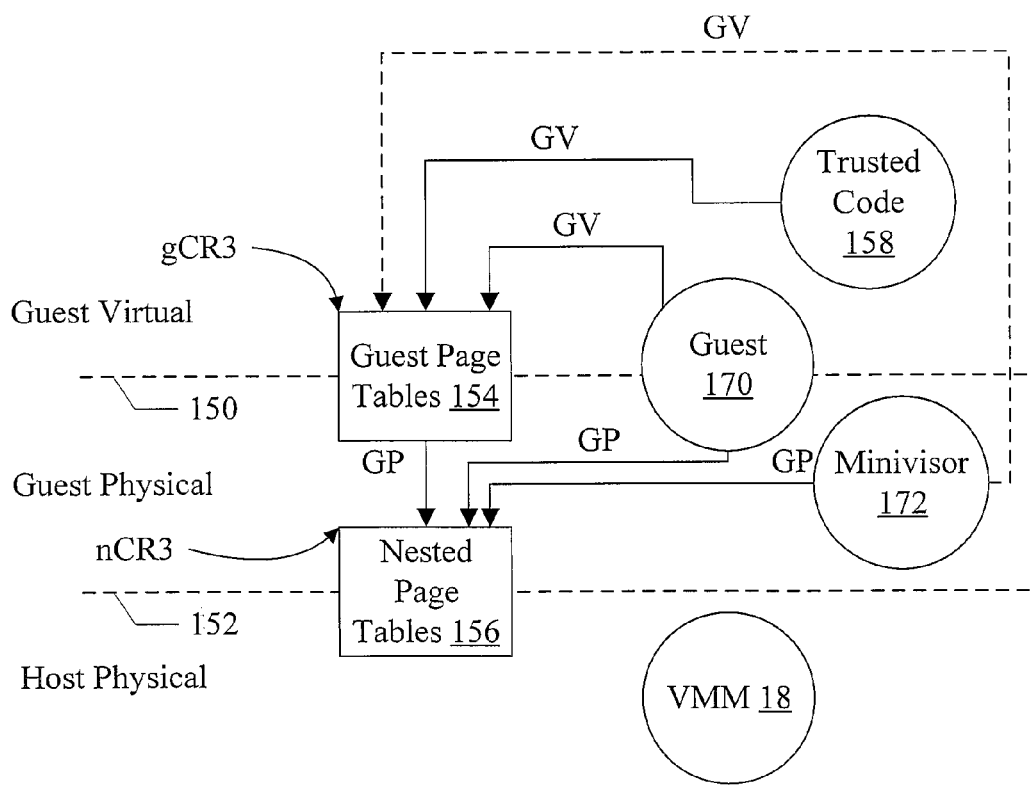
FIG. 15 is a block diagram illustrating one embodiment of address spaces in a virtualized computer system and the guest, minivisor, and host.

FIG. 15 is a block diagram illustrating various address spaces of one embodiment of the computer system, and operation of the various components shown in FIG. 2 within the address spaces for one embodiment. FIG. 15 illustrates a guest virtual address space (above dashed line 150), a guest physical address space (between dashed lines 150 and 152), and a host physical address space (below dashed line 152).

The guest 170 may run partially in the guest virtual address space and partially in the guest physical address space, illustrated by showing the guest 170 straddling the dashed line 150. The guest 170 may manage a set of guest page tables 154, pointed to by a page table base address register (gCR3, in FIG. 15). The guest 170 may translate guest virtual addresses (GV in FIG. 15) to guest physical addresses (GP) through the guest page tables 154. In other embodiments, the guest 170 may run completely in the guest virtual address space.

A set of nested page tables 156 is also shown in FIG. 15, that translates guest physical addresses to host physical addresses. The nested page tables 156 may be pointed to by a second page table base address register (nCR3, in FIG. 15). The two page table base address registers may be implemented in the translation circuitry 48 shown in FIG. 3, for example. The nested page tables 156 may be managed by the VMM 18.

The nested page tables 156 may translate guest physical addresses resulting from the guest page tables 156, as well as guest physical addresses generated directly by the guest 170 (e.g. by the OS). Additionally, the minivisor 172 may execute in the guest physical address space, using the guest physical pages reserved by the guest 170 for the minivisor 172. The minivisor's guest physical pages may be mapped as execute-only in the nested page tables 156. The minivisor 172 may have access to the guest physical address space used by the guest, as well as the guest virtual address space (e.g. by reading the guest page tables 154, illustrated by the dotted line in FIG. 15). Alternatively, the minivisor 172 may execute in guest virtual address space, using guest virtual pages allocated by the guest 170 and translated to the guest physical pages (through the guest page tables 154) that are mapped execute-only in the nested page tables 156. Similarly, the trusted code 158 shown in FIG. 15 in the guest virtual address space may be stored in guest virtual pages that are mapped to guest physical pages that are execute-only in the next page tables 156.

Computer Accessible Storage Medium

Figure 16:
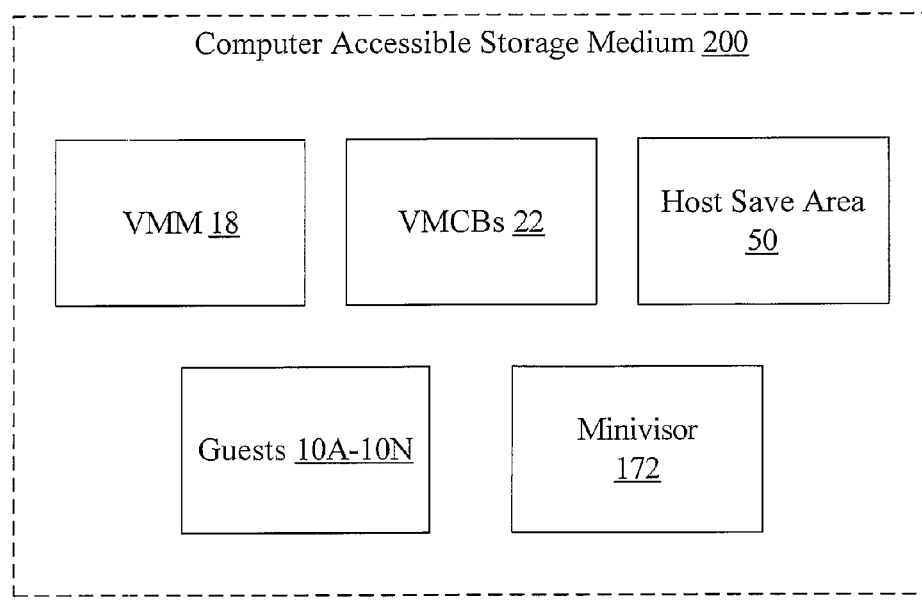
FIG. 16 is a block diagram of one embodiment of a computer accessible medium.

Turning now to FIG. 16, a block diagram of a computer accessible storage medium 200 is shown. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, or DVD-ROM, CD-R, CD-RW, DVD-R, DVD-RW, volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. The computer accessible storage medium 200 may also include storage media accessible via transmission media such as a network and/or a wireless link. The computer accessible storage medium 200 in FIG. 17 may store one or more of the VMM 18, one or more VMCBs 22, the host save area 50, the minivisor 172, and/or guests 10A-10N. The VMM 18 may comprise instructions which implement the operations described for the VMM 18 herein. Similarly, the minivisor 172 may comprise instructions which implement the operation of the minivisor as described herein. Generally, the computer accessible medium 200 may store any set of instructions which, when executed, implement a portion or all of the operations shown in FIGS. 4 and 14. The computer accessible storage medium 200 may, in some embodiments, be part of the host hardware 20.

Numerous variations and modifications will become apparent to those skilled in the art once the above disclosure is fully appreciated. It is intended that the following claims be interpreted to embrace all such variations and modifications.

What is claimed is:

1. A processor comprising:

an execution core configured to execute instructions; and a register configured to store an execute-only valid indication indicative of whether or not execution of instructions is permitted in pages that are indicated as execute-only in a set of page tables used by the processor for address translation;

wherein the execution core is configured, responsive to a fetch within an execute-only page, to signal a fault responsive to the execute-only valid indication indicating that execution is not permitted in the execute-only page, and wherein the execution core is configured to permit the fetch within the execute-only page responsive to the execute-only valid indication indicating that execution is permitted in the execute-only page, and wherein the execution core is configured to set the execute-only valid indication to a state indicating that execution is permitted in the execute-only page responsive to at least one predefined transition mechanism, and wherein the execution core is further configured to detect a return to code that initiated the predefined transition mechanism, wherein the execution core is configured to set the execute-only valid indication to a state indicating that execution is not permitted from the execute-only page.

2. The processor as recited in claim 1 wherein the execution core is configured to permit a fetch from another page that is not indicated as execute-only independent of the execute-only valid indication.

3. The processor as recited in claim 1 wherein the predefined transition mechanism is a call gate defined to transition the execute-only valid indication.

4. The processor as recited in claim 1 wherein the predefined transition mechanism is an exit from a virtual machine guest that is controlled by a virtual machine monitor.

5. The processor as recited in claim 4 wherein the exit is to a minivisor portion of the virtual machine monitor that executes in the guest's address space, wherein the minivisor portion is stored in execute-only pages.

6. The processor as recited in claim 1 wherein the predefined transition mechanism is a specific instruction defined to transition execution to code in the execute-only page.

7. A method comprising:

a processor detecting an event during execution of a virtual machine guest that is controlled by a virtual machine monitor, wherein the event is defined to enable execution from one or more execute-only pages;

the processor enabling execution from the execute-only pages responsive to detecting the event, wherein enabling execution comprises placing an execute-only valid indication in a first state indicating that execution from the execute only pages is permitted;

the processor detecting a return to the virtual machine guest; and the processor disabling execution from the execute-only pages responsive to detecting the return to the virtual machine guest, wherein disabling execution comprises placing the execute-only valid indication in a second state indicating that execution from the execute-only pages is not permitted.

8. The method as recited in claim 7 further comprising:

the processor generating a fetch in an execute-only page; and the processor permitting the fetch responsive to the enabling.

9. The method as recited in claim 7 further comprising:

the processor generating another fetch to the execute-only page; and the processor page faulting the fetch responsive to the disabling.

10. The method as recited in claim 8 wherein the event comprises a call instruction specifying a call gate that is defined to enable execution in the execute-only page.

11. The method as recited in claim 8 wherein the event comprises an intercept that is to exit to a minivisor portion of the virtual machine monitor, wherein the minivisor portion executes in the guest's address space.

* * * * *